US011586051B2

(12) United States Patent
Kim et al.

(10) Patent No.: US 11,586,051 B2
(45) Date of Patent: Feb. 21, 2023

(54) OPTICAL IMAGE STABILIZING MODULE AND CAMERA MODULE INCLUDING THE SAME

(71) Applicant: SAMSUNG ELECTRO-MECHANICS CO., LTD., Suwon-si (KR)

(72) Inventors: Jae Kyung Kim, Suwon-si (KR); Nam Ki Park, Suwon-si (KR); Ta Kyoung Lee, Suwon-si (KR); Bong Won Jeong, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 317 days.

(21) Appl. No.: 17/094,036

(22) Filed: Nov. 10, 2020

(65) Prior Publication Data

US 2021/0055569 A1    Feb. 25, 2021

Related U.S. Application Data

(63) Continuation of application No. 16/117,377, filed on Aug. 30, 2018, now Pat. No. 10,866,430.

(30) Foreign Application Priority Data

Oct. 31, 2017  (KR) .................. 10-2017-0143074

(51) Int. Cl.
*G02B 27/64* (2006.01)
*G03B 5/00* (2021.01)
*G03B 17/17* (2021.01)

(52) U.S. Cl.
CPC ............. *G02B 27/646* (2013.01); *G03B 5/00* (2013.01); *G03B 17/17* (2013.01); *G03B 2205/0015* (2013.01); *G03B 2205/0023* (2013.01)

(58) Field of Classification Search
CPC ........ G02B 27/646; G02B 27/64; G03B 5/00; G03B 5/02; G03B 5/04; G03B 5/06;
(Continued)

(56) References Cited

U.S. PATENT DOCUMENTS 9,020,334 B1   4/2015   Suzuka
9,258,486 B2   2/2016   Hu et al.
(Continued)

FOREIGN PATENT DOCUMENTS

CN     101013192 A    8/2007
CN     103676405 A    3/2014
(Continued)

OTHER PUBLICATIONS

Chinese Office Action dated Aug. 27, 2021, in counterpart Chinese Patent Application No. 202011492673.5 (3 pages in English and 5 pages in Chinese).

(Continued)

*Primary Examiner* — William R Alexander
(74) *Attorney, Agent, or Firm* — NSIP Law

(57) ABSTRACT

An optical image stabilizing (OIS) module and a camera module are provided. The OIS module includes a driving holder provided on a bottom surface of a housing, a driving frame comprising a reflection member and supported on an inner wall of the driving holder, a driving part configured to provide a driving force to move the driving holder and the driving frame, wherein the driving holder is configured to move in one or more of a linear direction and a rotational direction on the bottom surface of the housing to move the reflection member in a first axial direction, perpendicular to an optical axis, and the driving frame is configured to move in one or more of the linear direction and the rotational (Continued)

direction on the inner wall of the driving holder to move the reflection member in a second axial direction, perpendicular to the optical axis.

29 Claims, 17 Drawing Sheets

(58) Field of Classification Search
CPC ........ G03B 17/00; G03B 17/02; G03B 17/17; G03B 2205/00; G03B 2205/0007; G03B 2205/0015; G03B 2205/002
USPC .......................................................... 359/557
See application file for complete search history.

(56) References Cited

U.S. PATENT DOCUMENTS

| | | | |
|---|---|---|---|
| 9,285,566 B2 | 3/2016 | Chan et al. | |
| 10,178,317 B2 | 1/2019 | Lee et al. | |
| 10,261,337 B2 | 4/2019 | Yeon et al. | |
| 10,284,780 B2* | 5/2019 | Goldenberg | G03B 5/00 |
| 10,564,442 B2 | 2/2020 | Seol et al. | |
| 2007/0183043 A1 | 8/2007 | Bito et al. | |
| 2007/0285520 A1 | 12/2007 | Kuroda | |
| 2013/0021485 A1 | 1/2013 | Hsu | |
| 2013/0201392 A1 | 8/2013 | Gutierrez | |
| 2015/0002683 A1 | 1/2015 | Hu et al. | |
| 2015/0042870 A1 | 2/2015 | Chan et al. | |
| 2015/0110480 A1 | 4/2015 | Suzuka | |
| 2016/0349528 A1* | 12/2016 | Kishine | C09J 5/00 |
| 2017/0187962 A1 | 6/2017 | Lee et al. | |
| 2018/0095293 A1 | 4/2018 | Yeon et al. | |
| 2018/0109660 A1* | 4/2018 | Yoon | G02B 13/0035 |
| 2018/0148314 A1 | 5/2018 | Takimoto et al. | |
| 2018/0217475 A1* | 8/2018 | Goldenberg | G02B 27/64 |
| 2018/0231793 A1 | 8/2018 | Jeong et al. | |
| 2018/0239161 A1 | 8/2018 | Seol et al. | |
| 2018/0343391 A1* | 11/2018 | Goldenberg | H04N 5/23248 |

FOREIGN PATENT DOCUMENTS

| | | |
|---|---|---|
| CN | 104280976 A | 1/2015 |
| CN | 204203597 U | 3/2015 |
| CN | 105556385 A | 5/2016 |
| CN | 106603895 A | 4/2017 |
| CN | 106911879 A | 6/2017 |
| CN | 108427235 A | 8/2018 |
| JP | 2007-228005 A | 9/2007 |
| JP | 2010-190984 A | 9/2010 |
| JP | 2015-011353 A | 1/2015 |
| JP | 2016-012042 A | 1/2016 |
| KR | 10-2007-0109840 A | 11/2007 |
| KR | 10-2016-0042066 A | 4/2016 |
| KR | 10-2017-0043889 A | 4/2017 |
| KR | 10-2017-0075442 A | 7/2017 |
| WO | WO 2015/021279 A1 | 2/2015 |

OTHER PUBLICATIONS

Chinese Office Action dated Sep. 2, 2020 in the corresponding Chinese Patent Application No. 201811274868.5 (7 pages in English, 8 pages in Chinese).

* cited by examiner

OPTICAL IMAGE STABILIZING MODULE AND CAMERA MODULE INCLUDING THE SAME

CROSS-REFERENCE TO RELATED APPLICATIONS

This application is a continuation of U.S. patent application Ser. No. 16/117,377 filed on Aug. 30, 2018, which claims the benefit under 35 U.S.C. § 119(a) of Korean Patent Application No. 10-2017-0143074 filed on Oct. 31, 2017, in the Korean Intellectual Property Office, the entire disclosures of which are incorporated herein by reference for all purposes.

BACKGROUND

1. Field

This application relates to an optical image stabilizing (OIS) module and a camera module including the same.

2. Description of Related Art

Recently, camera modules have been typically provided in portable electronic devices such as tablet personal computers (PC), notebooks, or similar devices. Additionally, smartphones, and cameras for mobile terminal have typically included functions such as an autofocusing function, an optical image stabilizing (OIS) function, a zoom function, and other similar functions, thus adding to the complexity of camera modules.

Further, since there is a desire to consider both the weight of the lens itself, and weights of other members to which the lens, and other similar members are attached, in a case of directly moving a barrel including the lens, a holder, and the like, for performing the OIS function, a predetermined amount or greater of driving force may be necessary for moving such members, thus increasing power consumption.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In a general aspect, an optical image stabilizing (OIS) module includes a driving holder provided on a bottom surface of a housing, a driving frame comprising a reflection member and supported on an inner wall of the driving holder; and a driving part configured to provide a driving force to move the driving holder and the driving frame, wherein the driving holder is configured to move in one or more of a linear direction and a rotational direction on the bottom surface of the housing to move the reflection member in a first axial direction, perpendicular to an optical axis, and the driving frame is configured to move in one or more of the linear direction and the rotational direction on the inner wall of the driving holder to move the reflection member in a second axial direction, perpendicular to the optical axis.

The driving holder may be configured to move in a rotational direction around an axis parallel to a first axis that is perpendicular to the optical axis and a second axis.

A plurality of ball members may be provided between the driving holder and the bottom surface of the housing.

A plurality of guide grooves in which the plurality of ball members are accommodated may be provided in a lower surface of the driving holder facing the housing, and the plurality of guide grooves may have a rounded shape.

A plurality of guide grooves in which the plurality of ball members are accommodated may be provided in the bottom surface of the housing facing the driving holder, and the plurality of guide grooves may have a rounded shape.

A plurality of guide grooves in which the plurality of ball members are accommodated may be provided in one of the bottom surface of the housing and a lower surface of the driving holder, the lower surface of the driving holder may have a tetragonal shape, and the plurality of guide grooves may be provided in one or more of four corner portions of the lower surface of the driving holder and a portion of the housing that faces corner portions of the driving holder.

The plurality of guide grooves may be provided in an arc shape based on an axis that is parallel to the Y-axis.

The driving frame may move in a rotational direction around an axis parallel to a first axis that is perpendicular to the optical axis when the driving frame is supported on the inner wall of the driving holder.

A plurality of ball members may be provided between the driving frame and the inner wall of the driving holder.

A guide rail, protruding toward the driving frame in a rounded shape, may be provided in an inner wall surface of the driving holder facing the driving frame, and a plurality of guide grooves, in which the plurality of ball members are accommodated, may be provided in the guide rail.

A guide rail accommodation portion recessed in a rounded shape may be provided in the driving frame facing the inner wall surface of the driving holder, and a plurality of guide grooves, in which the plurality of ball members are accommodated, may be provided in the guide rail accommodation portion.

A plurality of guide grooves, in which a plurality of ball members are accommodated, may be provided in the driving frame or the inner wall of the driving holder, and the plurality of guide grooves may be extended in a second axial direction and may be provided as two guide grooves spaced apart from each other in the first axial direction in the driving frame or the driving holder.

The plurality of guide grooves may be provided in an arc shape based on an axis that is parallel to the X-axis.

The plurality of ball members provided between the driving holder and the bottom surface of the housing may be provided to be one or more of fixed to the driving holder, fixed to the housing, and freely rotatable.

The plurality of ball members provided between the driving frame and the inner wall of the driving holder may be provided to be one or more of fixed to the driving frame, fixed to the driving holder, and freely rotatable.

In a general aspect, a camera module includes a lens module including a plurality of lenses, and an optical image stabilizing (OIS) module disposed in front of the lens module and configured to change a path of light incident in the camera module toward the lens module.

In a general aspect, a camera module includes a housing. a reflection module comprising a driving holder and a driving frame coupled to the driving holder, wherein the driving holder is configured to move in one of an X-axis direction and a rotational direction around a virtual axis parallel to a Y-axis to move the reflection module in the X-axis direction, and the driving frame is configured to move in one of the Y-axis and a rotational direction around the virtual axis parallel to the X-axis to move the reflection module in the Y-axis direction, wherein an optical image stabilization (OIS) function is implemented based on the movement of the driving holder and the movement of the driving frame.

The movement of the driving frame and the movement of the driving holder may change a movement direction of light incident on the reflection module.

The driving frame may simultaneously move in a rotational direction while moving in a linear direction in the driving holder.

A plurality of ball members are provided between the driving frame and an inner wall of the driving holder.

Other features and aspects will be apparent from the following detailed description, the drawings, and the claims.

Figure 1:
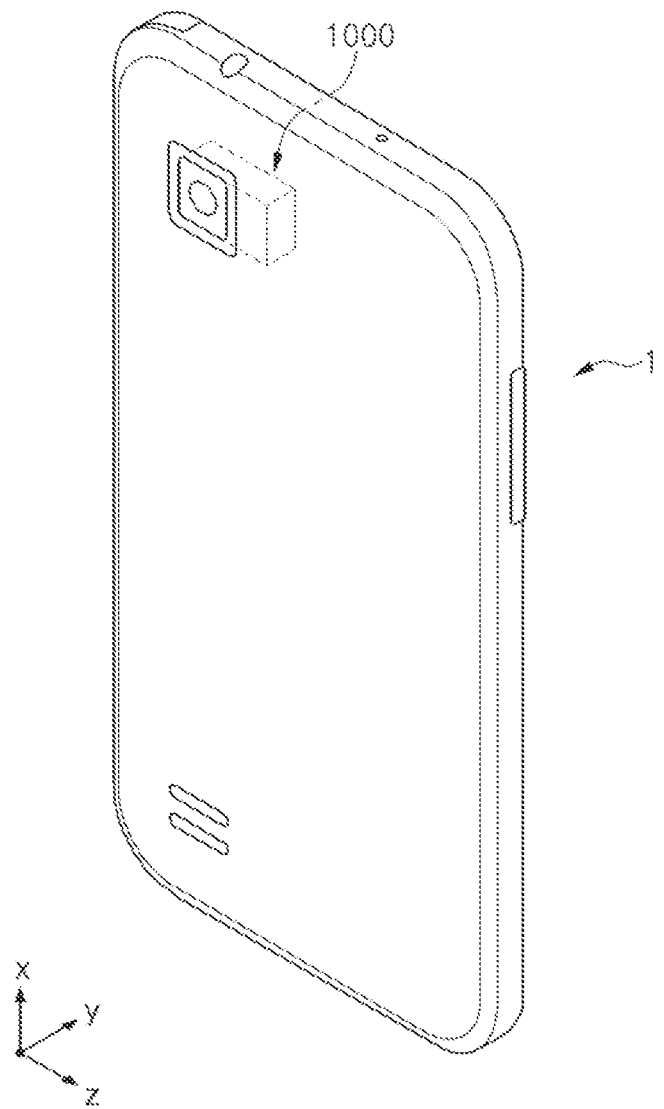
FIG. 1 is an example of a perspective view of a portable electronic device.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is an example of a perspective view of a portable electronic device 1.

Referring to FIG. 1, a portable electronic device 1 may be a portable electronic device mounted with a camera module 1000, for example, a mobile communications terminal, a smart phone, or a tablet PC, or similar devices.

As illustrated in FIG. 1, the camera module 1000 may be mounted in the portable electronic device 1 to capture an image of a subject.

The camera module 1000 may include a plurality of lenses, and an optical axis (a Z-axis) direction of the lenses may be perpendicular to a thickness direction (a Y-axial direction, a direction from a front surface of the portable electronic device to a rear surface thereof or a direction opposite thereto) of the portable electronic device 1.

As a non-limiting example, an optical axis (a Z-axis) of the plurality of lenses provided in the camera module 1000 may be formed in a width direction or the length direction (an X-axial direction or the Z-axial direction) of the portable electronic device 1.

Therefore, although the camera module 1000 has functions such as an autofocusing (AF) function, a zoom function, and an optical image stabilizing (hereinafter, referred to as OIS) function, and the like, a thickness of the portable electronic device may not be increased. Therefore, the portable electronic device 1 may be miniaturized.

The camera module 1000 may have at least one of the AF function, the zoom function, and the OIS function.

Since various components that perform functions such as the AF function, the zoom function, the OIS function are provided in the camera module 1000, a size of the camera module may be increased as compared to a general camera module.

When the size of the camera module 1000 is increased, the portable electronic component in which the camera module 1000 is mounted may not have a miniaturized form factor.

For example, the number of stacked lenses in a camera module may be increased for a zoom function, and when a large number of stacked lenses are formed in a thickness direction of a portable electronic component, a thickness of the portable electronic device may be increased depending on the number of stacked lenses. Therefore, when the thickness of the portable electronic device is not increased, a sufficient number of stacked lenses may not be secured, thus deteriorating the zoom function.

Further, in order to implement the AF and OIS functions, there is a desire to install an actuator that moves a lens group in an optical axial direction, or a direction perpendicular to an optical axis. However, when the optical axis (the Z-axis) of the lens group is formed in a thickness direction of the portable electronic device, the actuator for moving the lens group should also be installed in the thickness direction of the portable electronic device. Therefore, a thickness of the portable electronic device may be increased.

However, since in the example camera module 1000 of FIG. 1, the optical axis (the Z-axis) of the plurality of lenses is disposed to be perpendicular to the thickness direction of the portable electronic device 1 (that is, the optical axis may be disposed to be in parallel to a wide surface or a width of the portable electronic device 1), although the camera module 1000 having the AF, zoom, and OIS functions is mounted, the portable electronic device 1 may be miniaturized.

Figure 2:
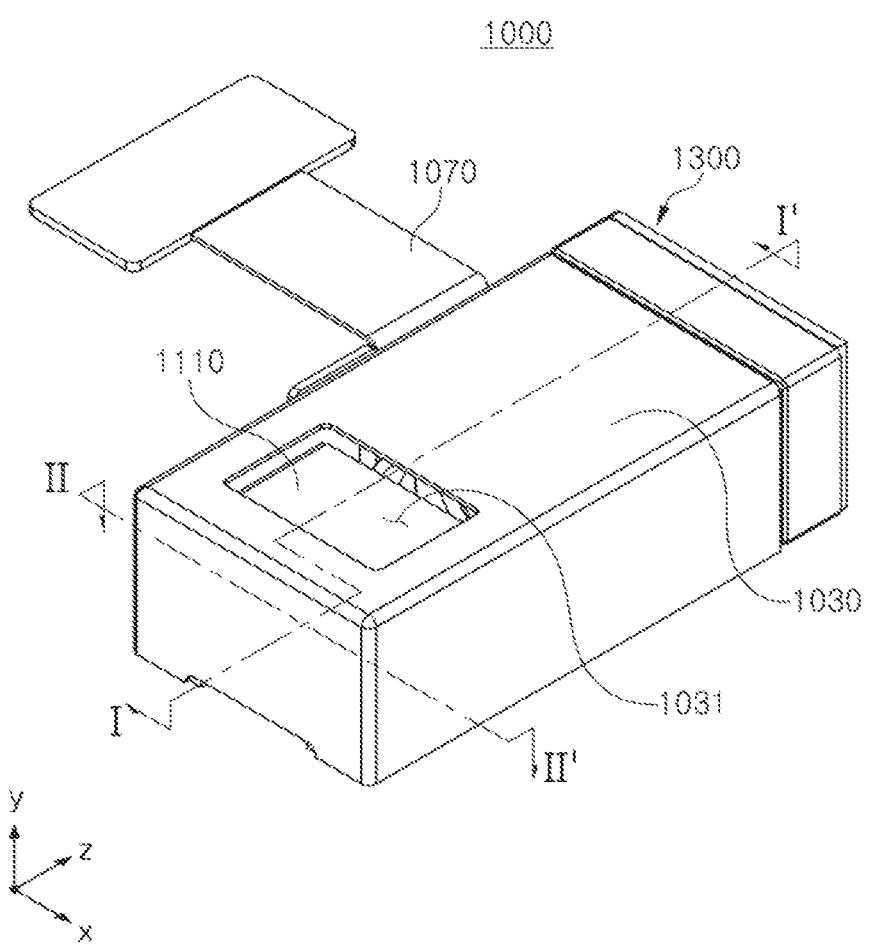
FIG. 2 is an example of a perspective view of a camera module.
Figure 3A:
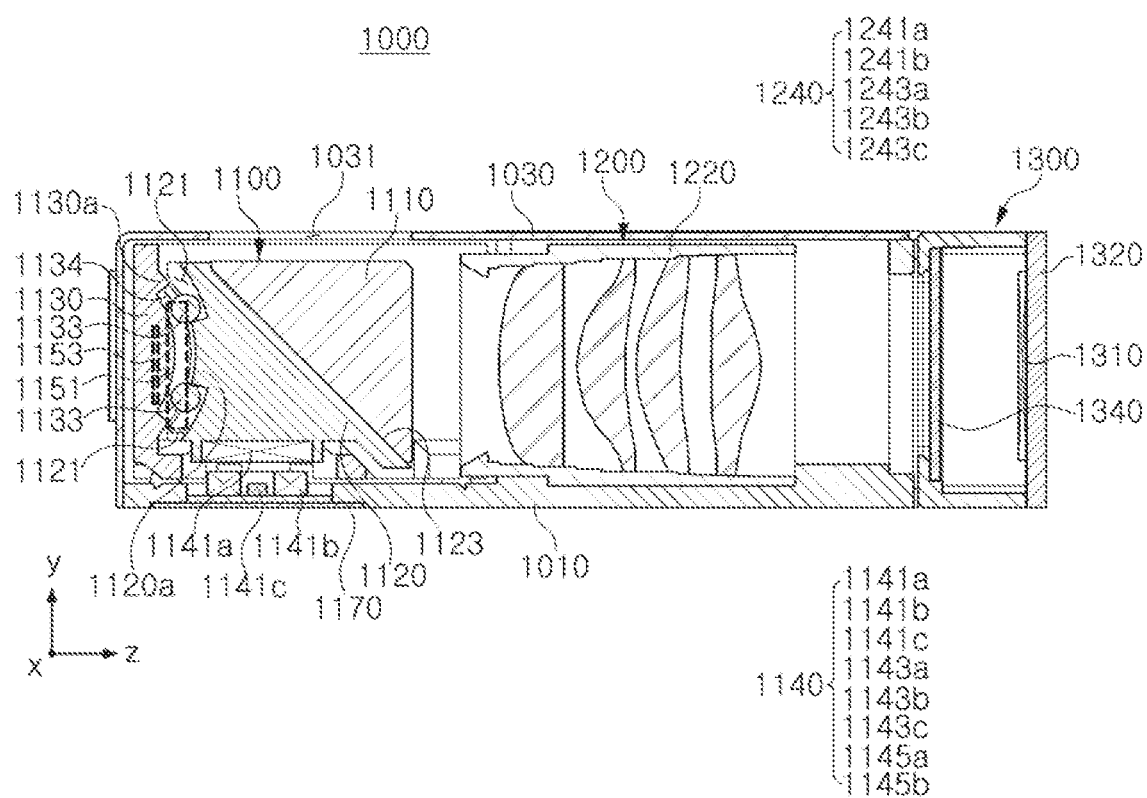
FIG. 3A is an example of a cross-sectional view taken along line I-I' of FIG. 2.
Figure 3B:
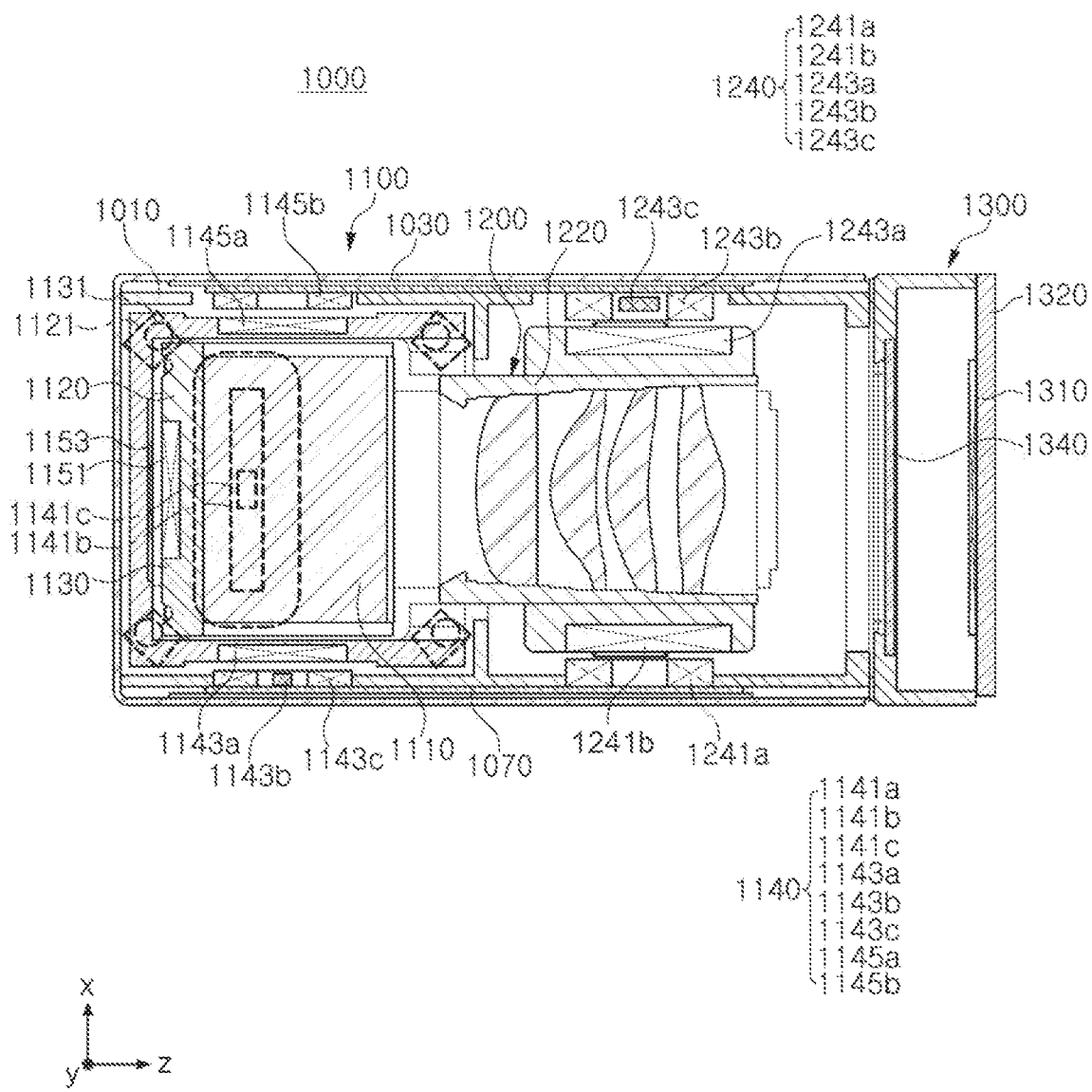
FIG. 3B is an example of a cross-sectional view taken along line II-II' of FIG. 2.

FIG. 2 is an example of a perspective view of a camera module, and FIGS. 3A and 3B are cross-sectional views of a camera module (respectively taken along lines I-I' and II-II' of FIG. 2).

Referring to FIGS. 2 through 3B, the camera module 1000 may include a reflection module 1100, a lens module 1200, and an image sensor module 1300 which may be provided in a housing 1010.

The reflection module 1100 may be formed to change a movement direction of light. As an example, a movement direction of light incident through an opening portion 1031 (see FIGS. 3A and 3B) of a cover 1030 covering an upper portion of the camera module 1000 may be changed to a direction toward the lens module 1200 through the reflection module 1100. To this end, the reflection module 1100 may include a reflection member 1110 that is configured to reflect light.

A path of the light incident through the opening portion 1031 of the cover 1030 may be changed by the reflection module 1100 to enter the lens module 1200. For example, a path of light incident in the thickness direction (the Y-axial direction) of the camera module 1000 may be changed by the reflection module 1100 so as to substantially coincide with the optical axis (the Z-axis) direction.

The lens module 1200 may include a plurality of lenses through which the light of which the movement direction is changed by the reflection module 1100 passes. An image sensor module 1300 may include an image sensor 1310 that converts the light passed through the plurality of lenses into an electrical signal and a printed circuit board 1320 on which the image sensor 1310 is mounted. Further, the image sensor module 1300 may include an optical filter 1340 that filters the light incident from the lens module 1200. The optical filter 1340 may be an infrared cut-off filter, but is not limited thereto.

In an internal space of the housing 1010, when considering a position of the lens module 1200, the reflection module 1100 may be provided in front of the lens module 1200, and the image sensor module 1300 may be provided in a position behind the lens module 1200.

Referring to FIGS. 2 through 10, in an example, the camera module 1000 may include the reflection module 1100, the lens module 1200, and the image sensor module 1300 which are provided in a housing 1010.

The reflection module 1100, the lens module 1200, and the image sensor module 1300 may be sequentially provided from a first side to a second side in the housing 1010, where the first side is opposite to the second side. In an example, the reflection module 1100, the lens module 1200, and the image sensor module 1300 may be embedded in the internal space of the housing 1010 (here, the printed circuit board 1320 constituting the image sensor module 1300 may be attached to the outside of the housing 1010). For example, as illustrated in FIGS. 2 to 10, the housing 1010 may be integrally provided so that the reflection module 1100 and the lens module 1200 are embedded in the internal space of the housing 1010. However, the housing is not limited thereto. For example, separate housings may be provided in which the reflection module 1100 and the lens module 1200 are respectively embedded, and may be connected to each other.

In addition, in an example, the housing 1010 may be covered with the cover 1030 so that the internal space is not shown.

The cover 1030 may include the opening portion 1031 so that light is incident through the opening portion 1031, and the movement direction of the light incident through the opening portion 1031 may be changed by the reflection module 1100, such that the light is incident on the lens module 1200. The cover 1030 may be integrally provided to cover the entire housing 1010. Alternatively, the cover 1030 may be divided into and provided as separate members that respectively cover the reflection module 1100 and the lens module 1200.

The reflection module 1100 may include the reflection member 1110 reflecting light. Further, the light incident on the lens module 1200 may be converted into an electrical signal to thereby be stored by the image sensor 1310 after passing through the plurality of lenses.

The housing 1010 may include the reflection module 1100 and the lens module 1200 in the internal space thereof. In the internal space of the housing 1010, a space in which the reflection module 1100 is disposed and a space in which the lens module 1200 is disposed may be mutually distinguished from each other by a protrusion wall 1007 (see, for example, FIG. 5). Further, based on the protrusion wall 1007, the reflection module 1100 may be provided in a front side of the camera module, and the lens module 1200 may be provided in a rear side of the camera module. The protrusion wall 1007 may be provided to protrude from both side walls of the housing 1010 to the internal space (protrude in the X direction). However, this is only an example, and the protrusion wall may protrude from a single side of the housing 1010.

The reflection module 1100 provided in the front side of the camera module may include a driving holder 1130 mounted on a bottom surface of the housing 1010 with a first ball member 1131 interposed therebetween, and a driving frame 1120 coupled to the driving holder 1130 to be tightly supported on the inner wall surface of the driving holder 1130. Further, the reflection module 1100 may have a structure in which an attractive force is formed between a pulling yoke 1153 provided on the inner wall surface of the driving holder 1130 and a pulling magnet 1151 provided in the driving frame 1120, and the driving frame 1120 may be tightly supported on the inner wall surface of the driving holder 1130 by the attractive force. Here, although not illustrated, a pulling magnet may also be provided in the driving holder 1130 and a pulling yoke may also be provided in the driving frame 1120. Hereinafter, for convenience of explanation, a structure illustrated in FIGS. 3B and 4 will be described.

The housing 1010 may include first and second driving parts 1140 and 1240 for driving the reflection module 1100 and the lens module 1200, respectively. The first driving part 1140 may include a plurality of coils 1141b, 1143b, and 1145b for driving the reflection module 1100, and the second driving part 1240 may include a plurality of coils 1241b and 1243b for driving the lens module 1200. Further, since the plurality of coils 1141b, 1143b, 1145b, 1241b, and 1243b are provided in the housing 1010 in a state in which they are mounted on a main substrate 1070, a plurality of through holes 1015, 1016, 1017, 1018, and 1019 may be provided so that the plurality of coils 1141b, 1143b, 1145b, 1241b, and 1243b are exposed to the internal space of the housing 1010.

The main substrate 1070 on which the plurality of coils 1141b, 1143b, 1145b, 1241b, and 1243b are mounted may be entirely connected to thereby be integrally provided as illustrated in the accompanying drawings. In this case, since a single terminal is provided, it may be easy to connect an external power supply and signal. However, the main substrate 1070 is not limited thereto. A substrate on which a coil for the reflection module 1100 is mounted and a substrate on which a coil for the lens module 1200 is mounted may be separated from each other, such that a plurality of substrates may be provided as the main substrate 1070.

The reflection module 1100 may change the path of the light incident through the opening portion 1031 of the cover 1030. At the time of capturing still images or moving images, image blurring or moving image shaking may occur due to hand-shake of a user, or the like. In this case, the reflection module 1100 may move the driving frame 1120 on which the reflection member 1110 is mounted to compensate the hand-shake of the user, or the like. For example, when images are shaken by hand-shake of the user, or the like, at the time of capturing still images or moving images, the shake may be compensated for by imparting relative displacement corresponding to the shake to the driving frame 1120.

Further, since the OIS function may be implemented by movement of the driving frame 1120 which does not include a lens, the camera module may thereby have a relatively light weight, thus power consumption may be significantly decreased.

That is, in order to implement the optical image stabilizing (OIS) function, the driving frame 1120 including the reflection member 1110 may be moved to change the movement direction of the light instead of moving the lens barrel, which includes a plurality of lenses, or moving an image sensor, such that the light subjected to optical image stabilization (OIS), or the like, may be incident on the lens module 1200.

The reflection module 1100 may include the driving holder 1130 provided in the housing 1010, the driving frame 1120 provided to be supported on the driving holder 1130, the reflection member 1110 mounted on the driving frame 1120, and the first driving part 1140 providing a driving force to the driving frame 1120.

The reflection member 1110 may change the movement direction of light based on a movement of one or more of the driving holder 1130 and the driving frame 1120. For example, the reflection member 1110 may be a mirror or prism reflecting light (for convenience of explanation, the reflection member 1110 is illustrated as the prism in the respective figures).

In an example, the reflection member 1110 may be fixed to the driving frame 1120. A mounting surface 1123 on which the reflection member 1110 is mounted may be provided in the driving frame 1120.

The mounting surface 1123 of the driving frame 1120 may be formed of an inclined surface so that the path of the light is changed. For example, the mounting surface 1123 may be an inclined surface inclined at an angle of 30 to 60 degrees with respect to the optical axis (the Z-axis) of the plurality of lenses. Further, the inclined surface of the driving frame 1120 may face the opening portion 1031 of the cover 1030 through which light is incident.

The driving frame 1120 mounted with the reflection member 1110 may be accommodated so as to be movable in the internal space of the housing 1010. In more detail, the driving frame 1120 may be accommodated in the driving holder 1130 provided in the internal space of the housing 1010. Further, the driving holder 1130 accommodating the driving frame 1120 therein may move in a linear direction in a first axis (the X-axis) direction or in a rotational direction around a virtual axis parallel to a second axis (Y-axis) so that the reflection member 1110 moves in the first axis (the X-axis) direction in the housing 1010, and the driving frame 1120 may move in a linear direction in the second axis (the Y-axis) direction in a state in which the driving frame 1120 is supported on the driving holder 1130 so that the reflection member 1110 moves in the second (the Y-axis) direction in the driving holder 1130. (Alternatively, the driving frame 1120 may move in a rotational direction around a virtual axis parallel to the first axis (the X-axis) so that the reflection member 1110 moves in the second axis (the Y-axis) direction).

Hereinafter, for convenience of explanation, a description will be provided based on a case in which the driving holder 1130 moves in a rotational manner or direction around the virtual axis parallel to the second axis (the Y-axis) in the housing 1010 and the driving frame 1120 moves in a rotational direction around the virtual axis parallel to the first axis (the X-axis) in the driving holder 1130 as illustrated in the accompanying drawings.

Here, the first axis (the X-axis) and the second axis (the Y-axis) may mean axes perpendicular to the optical axis (the Z-axis), and the first axis (the X-axis) and the second axis (the Y-axis) may be perpendicular to each other.

The driving holder 1130 may move in a rotational direction around the second axis (the Y-axis) with respect to the housing 1010. Therefore, the reflection member 1110 provided in the driving holder 1130 may move in the first axis (the X-axis) direction.

Figure 6:
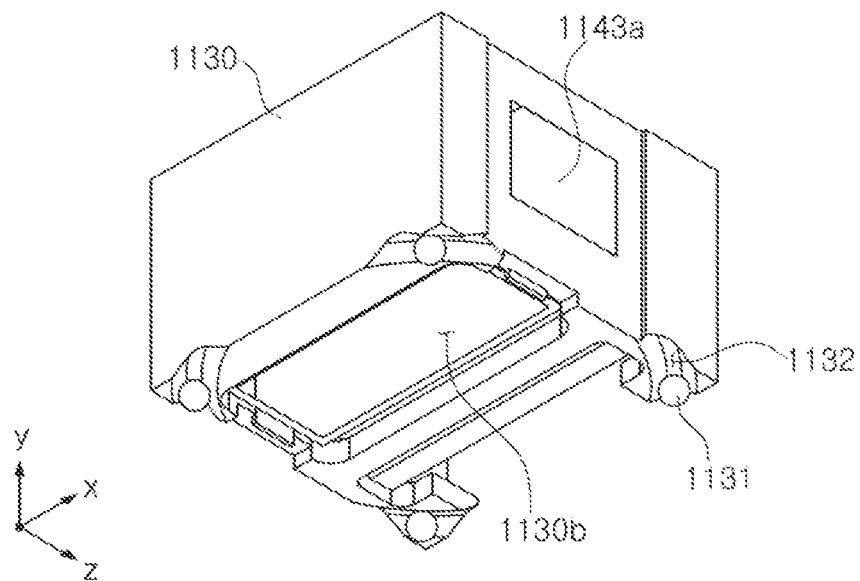
FIG. 6 is an example of a bottom perspective view of a driving holder of a camera module.
Figure 7:
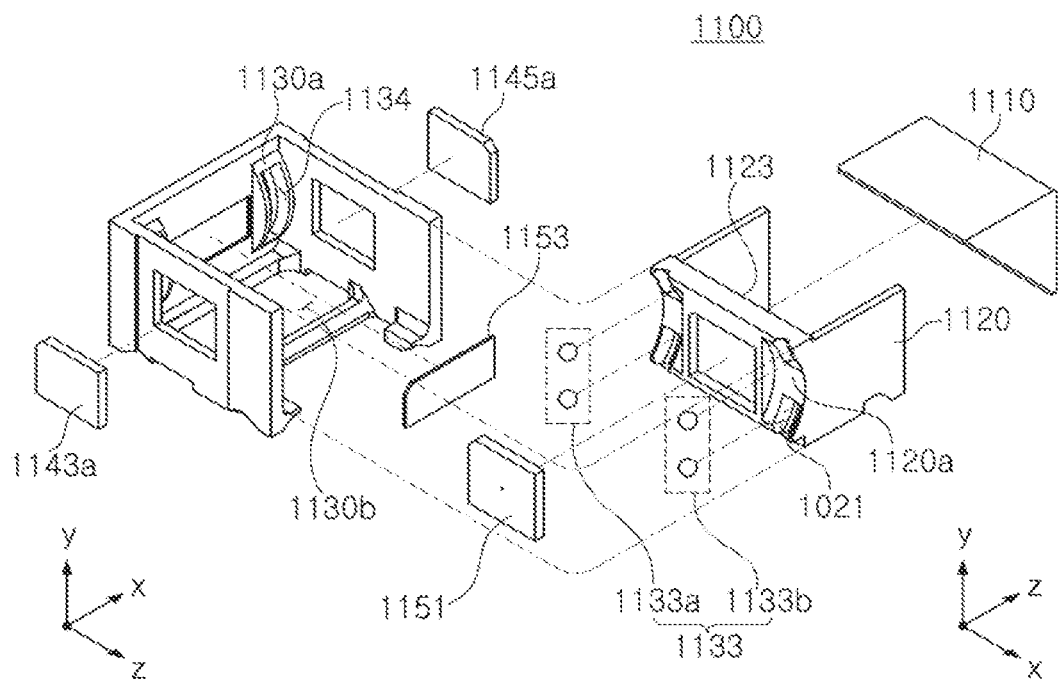
FIG. 7 is an example of an exploded perspective view of a driving holder and a driving frame of a camera module.
Figure 8:
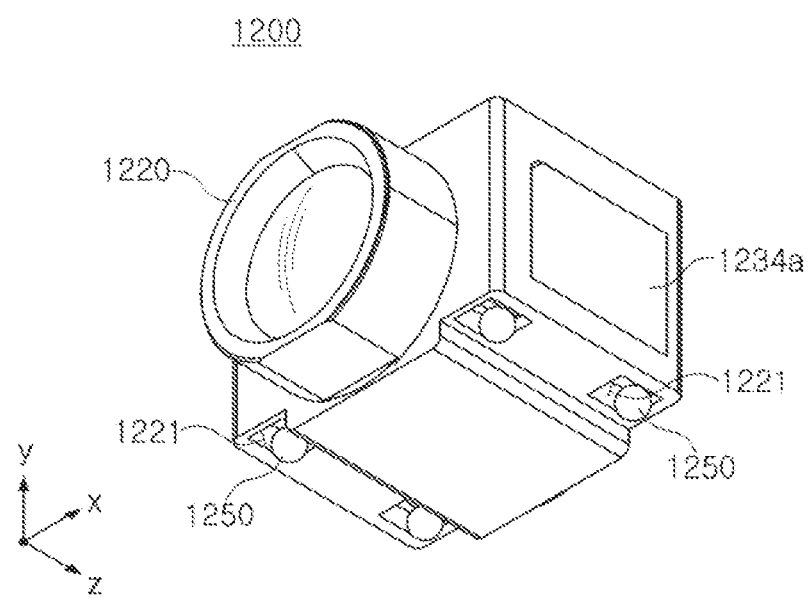
FIG. 8 is an example of a perspective view of a lens holder of a camera module.
Figure 9:
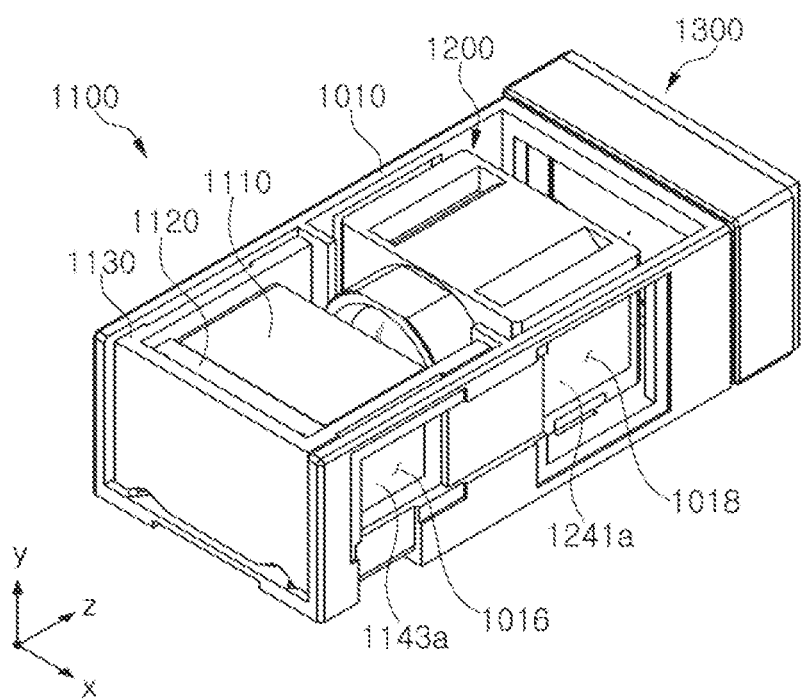
FIG. 9 is an example of an assembly perspective view of a reflection module, a lens module, and an image sensor module.
Figure 10:
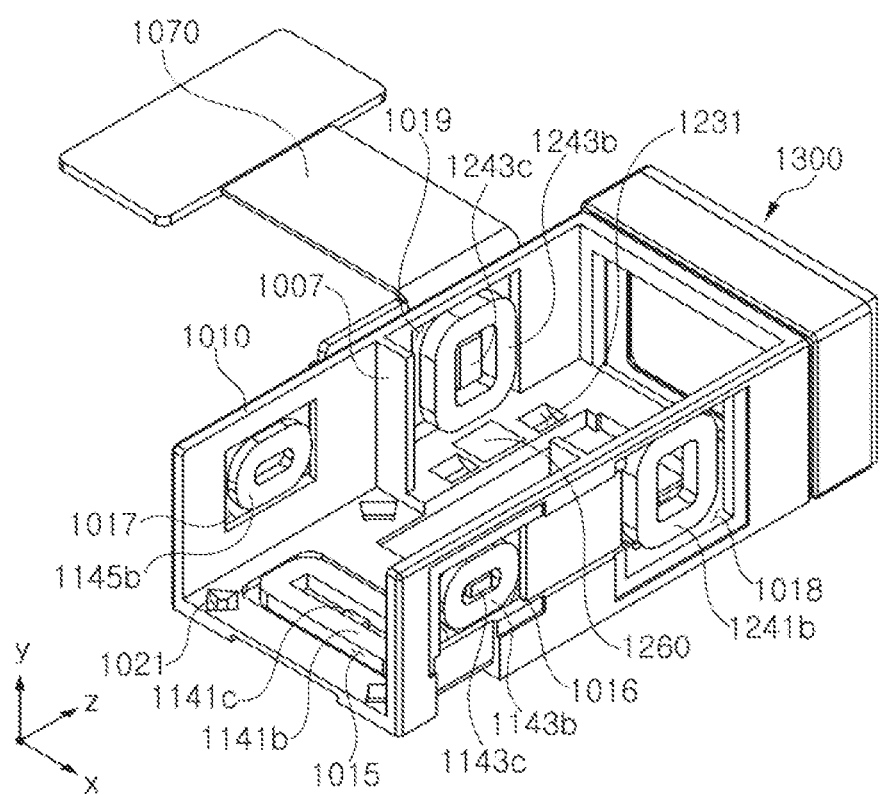
FIG. 10 is an example of an assembly perspective view of a housing and a substrate in a camera module.

In an example, driving holder 1130 may be supported on the bottom surface of the housing 1010 with the first ball member 1131 interposed therebetween. The first ball member 1131 may be partially inserted into a first guide groove 1021 (FIG. 5) provided in the bottom surface of the housing 1010 or a second guide groove 1132 provided in a lower surface of the driving holder 1130 (FIG. 6). In addition, the first and second guide grooves 1021 and 1132 may be provided in an arc shape based on the virtual axis parallel to the second axis (the Y-axis) so as to easily guide rotation of the first ball member 1131.

That is, based on a bottom surface of the driving holder 1130, the second guide groove 1132 may be provided as arcs of a substantial circle based on the center of the bottom surface of the driving holder 1130. Therefore, when the bottom surface of the driving holder 1130 is considered to have a tetragonal shape, four second guide grooves 1132 may be provided in corner portions of the driving holder 1130. Further, four first guide grooves 1021 may be provided at positions corresponding to the corner portions of the driving holder 1130.

In an example, the first ball member 1131 may not be fixed to the driving holder 1130 and the housing 1010, but may be inserted into the first and second guide grooves 1021 and 1132 to move in a rolling motion. Further, the first ball member 1131 may be fixed to the driving holder 1130 or the housing 1010. In this case, a guide groove may be provided only in a member to which the first ball member 1131 is not fixed, such that the first ball member 1131 may move in a sliding motion.

Further, the driving holder 1130 may include magnets 1143a and 1145a acting on the coils 1143b and 1145b included in the first driving part 1140 and provided in the housing 1010, and a pulling yoke 1161 may be provided at a position corresponding to the magnets 1143a and 1145a in the housing 1010 so that the driving holder 1130 may be firmly supported on the bottom surface of the housing 1010.

The driving frame 1120 may be supported by the housing 1010 by a second ball member 1133 arranged along the second axis (the Y-axis) so as to smoothly move in a linear motion or direction (or rotational motion or direction around the virtual axis parallel to the first axis (the X-axis)). That is, as illustrated in FIGS. 2-10, the above-mentioned first ball member 1131 may be in charge of the rotational direction around the second axis (the Y-axis) (the reflection member 1110 moves in the first axis (the X-axis) direction), and the second ball member 1133 may be in charge of the linear motion or direction along the second axis (the Y-axis) (or the rotational motion or direction around the virtual axis parallel to the first axis (the X-axis)) (the reflection member 1110 moves in the second axis (the Y-axis) direction). In an example, since the reflection member 1110 may be moved in the first axis (the X-axis) or second axis (the Y-axis) direction by the rotational direction of the driving holder 1130 and the driving frame 1120, the reflection member 1110 may be sufficiently moved by motion at a short distance as compared to linear motion, such that driving efficiency may be improved.

Figure 4:
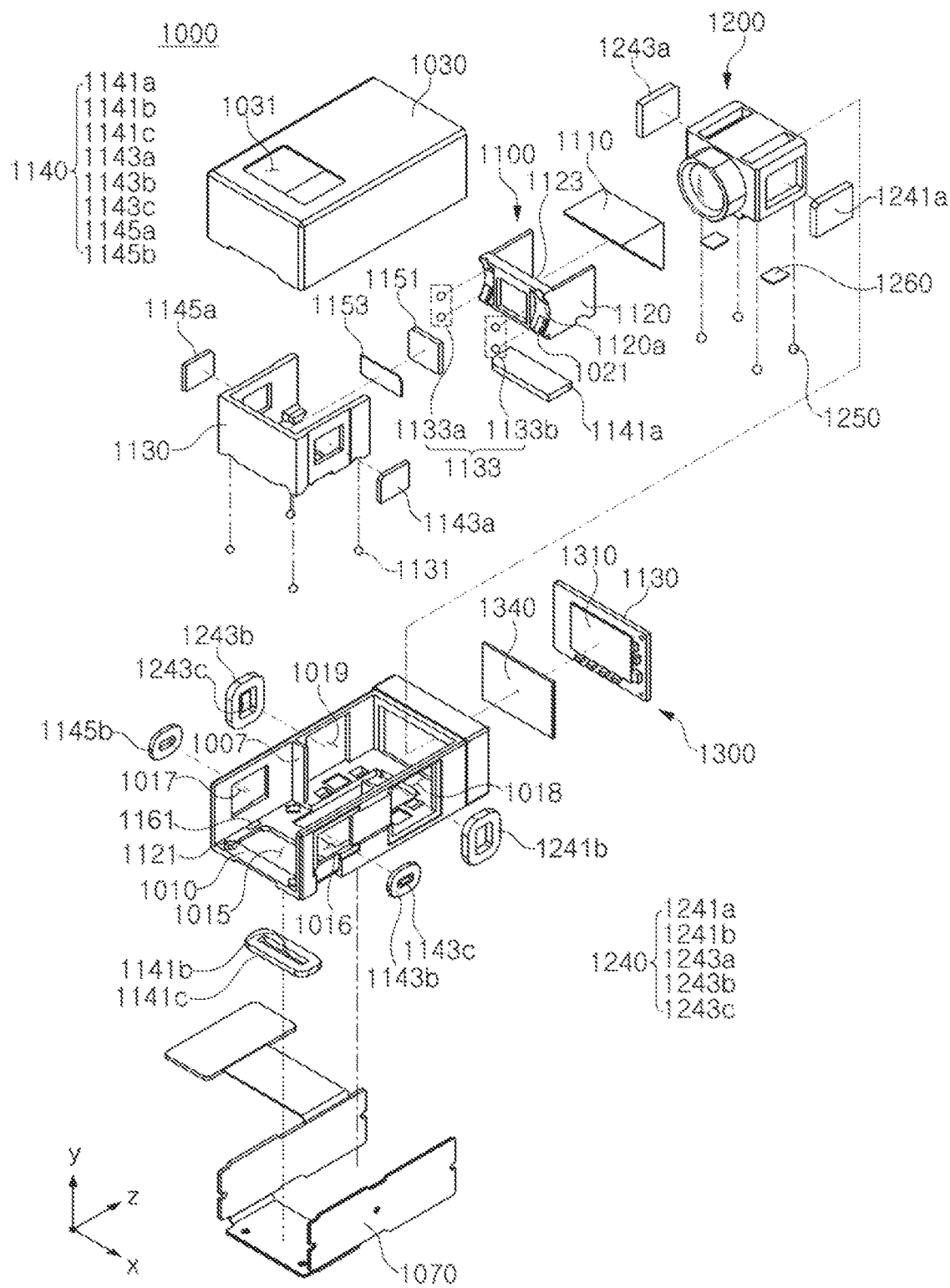
FIG. 4 is an example of an exploded perspective view of a camera module.
Figure 5:
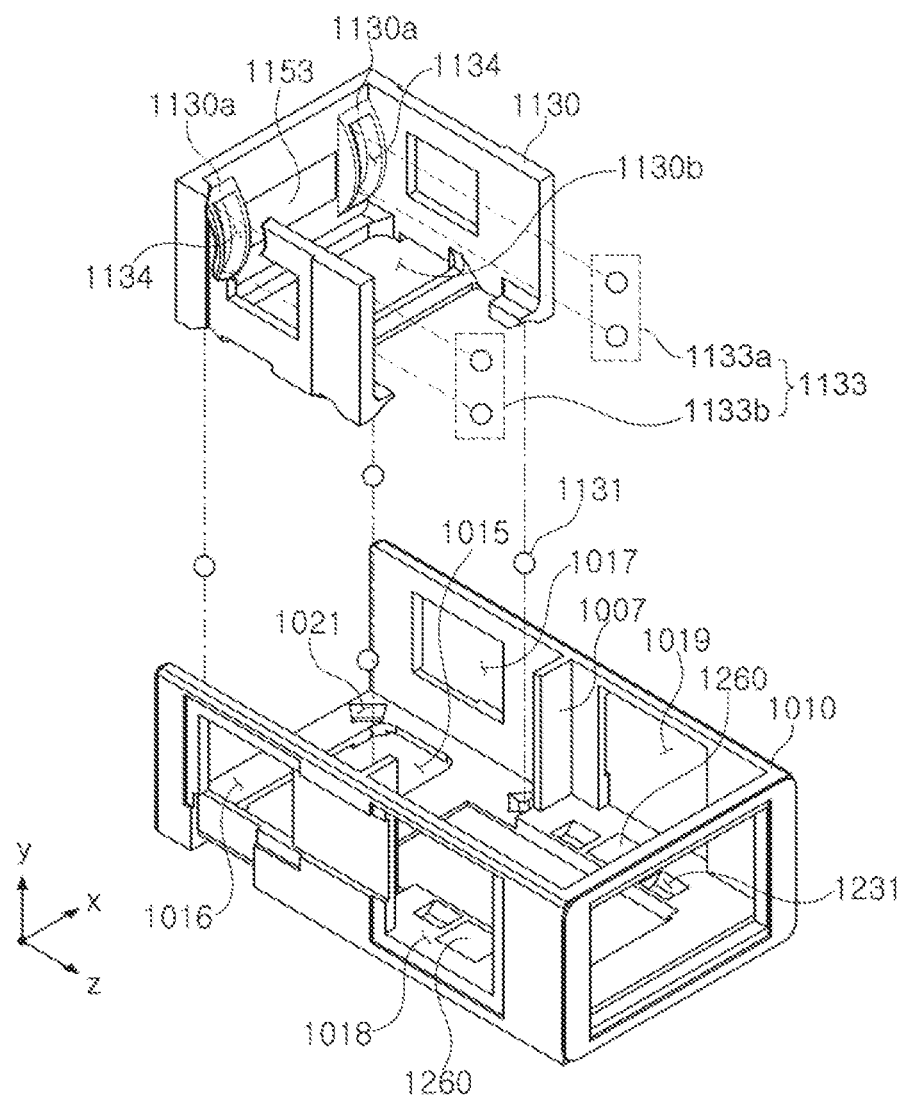
FIG. 5 is an example of a perspective view of a housing of a camera module.

In FIG. 4, as an example, two sets 1133a and 1133b of two second ball members 1133 arranged along the second axis (the Y-axis) are illustrated. Since the driving frame 1120 moves along the second axis (the Y-axis) in a state in which the driving frame 1120 is supported on the driving holder 1130, at least two sets 1133a and 1133b of the second ball members 1133 arranged in parallel to each other in the second axis (the Y-axis) direction, spaced apart from each other in the first axis (the X-axis) direction, may be required for stable movement. In this case, only a single second ball member 1133 may be provided in one of the two sets 1133a and 1133b.

In an example, the driving frame 1120 may simultaneously move in a rotational direction while moving in a linear direction in the driving holder 1130.

That is, a guide rail 1130a (FIG. 5) protruding toward the driving frame 1120 in a rounded shape may be provided in the inner wall surface of the driving holder 1130 facing the driving frame 1120, and a third guide groove 1134, into which the second ball member 1133 is inserted, may be provided in the guide rail 1130a. Further, in the driving frame 1120, a guide rail accommodation portion 1120a recessed inwardly may be provided in a portion facing the guide rail 1130a, and a fourth guide groove 1121 may be provided in the guide rail accommodation portion 1120a. A degree of depression of the guide rail accommodation portion 1120a may correspond to a degree of protrusion of the guide rail 1130a in a rounded shape.

Here, the third guide groove 1134 may be provided as arcs of a circle based on a virtual axis parallel to the first axis (the X-axis).

In an example, the second ball member 1133 may not be fixed to the driving holder 1130 and the driving frame 1120, but may be inserted into the third and fourth guide grooves 1134 and 1121 to move in a rolling motion. Further, the second ball member 1133 may be fixed to the driving holder 1130 or the driving frame 1120. In this case, a guide groove may be provided only in a member to which the second ball member 1133 is not fixed, such that the second ball member 1133 may move in a sliding motion.

There is a desire to maintain a state in which the driving frame 1120 is supported on the inner wall surface of the driving holder 1130. Therefore, the pulling yoke 1153 may be provided in the inner wall surface of the driving holder 1130, and the pulling magnet 1151 may be provided in the driving frame 1120, such that the driving frame 1120 may be firmly supported on the inner wall surface of the driving holder 1130 by an attractive force formed between the pulling yoke 1153 and the pulling magnet 1151. Here, although not illustrated in the accompanying drawings, a pulling magnet may also be provided in the driving holder 1130 and a pulling yoke may also be provided in the driving frame 1120.

In addition, a magnet 1141a may be provided in a bottom surface of the driving frame 1120 so as to act on the coil 1141b provided in the housing 1010 to generate a driving force.

In order to easily move or rotate the first and second ball members 1131 and 1133, a depth of the grooves may be smaller than a radius of the ball members 1131 and 1133. The first and second ball members 1131 and 1133 may not be entirely immersed in the groove but may be partially exposed, such that movement of the driving holder 1130 and rotation of the driving frame 1120 may be easily performed.

Further, the first guide groove 1021, the second guide groove 1132, the third guide groove 1134, and the fourth guide groove 1121 may be provided at positions and in numbers corresponding to the set of the first and second ball members 1131 and 1133.

Here, the first and second ball members 1131 and 1133 may serve as bearings while moving in a rolling motion or sliding motion in the first guide groove 1021, the second guide groove 1132, the third guide groove 1134, and the fourth guide groove 1121.

Here, in a structure in which the first and second ball members 1131 and 1133 are fixed and provided in any one of the housing 1010, the driving holder 1130, and the driving frame 1120, the first and second ball members 1131 and 1133 may be provided in a spherical or hemispherical shape (of course, the hemispherical shape is only an example, and the first and second ball members 1131 and 1133 may be provided to have a protrusion length larger or smaller than a hemisphere).

Further, the first and second ball members 1131 and 1133 may be separately manufactured and provided or attached to any one of the housing 1010, the driving holder 1130, and the driving frame 1120. Alternatively, at the time of manufacturing the housing 1010, the driving holder 1130, and the driving frame 1120, the first and second ball members 1131 and 1133 may be integrally provided.

The first driving part 1140 may generate a driving force so that the driving holder 1130 may move in the linear direction along the second axis (the Y-axis) (or the rotational direction around the axis parallel to the first axis (the X-axis)) or the driving frame 1120 may move in the rotational direction around the second axis (the Y-axis).

As an example, as illustrated in the accompanying drawings, the first driving part 1140 may include the plurality of magnets 1141a, 1143a and 1145a and the plurality of coils 1141b, 1143b, and 1145b disposed to face the plurality of magnets 1141a, 1143a and 1145a.

When power is applied to the plurality of coils 1141b, 1143b, and 1145b, the driving holder 1130 on which the plurality of magnets 1143a and 1145a are mounted may be moved in the rotational direction around the axis parallel to the second axis (the Y-axis)) or the driving frame 1120 on which the magnet 1141a is mounted may be moved in the second axis (the Y-axis) direction (or rotate around the axis parallel to the first axis (the X-axis) by electromagnetic interaction between the plurality of magnets 1141a, 1143a, and 1145a and the plurality of coils 1141b, 1143b, and 1145b.

Some magnets 1143a and 1145a of the plurality of magnets 1141a, 1143a, and 1145a may be mounted on both side surfaces of the driving holder 1130, respectively, and the other magnet 1141a may be mounted on a lower surface of the driving frame 1120. Therefore, an opening portion 1130b may be formed in the bottom surface of the driving holder 1130 so that the magnet 1141a mounted on the driving frame 1120 faces the coil 1141b mounted in the housing 1010.

The plurality of coils 1141b, 1143b, and 1145b may be mounted in the housing 1010. As an example, the plurality of coils 1141b, 1143b, and 1145b may be mounted in the housing 1010 via the main substrate 1070. That is, the plurality of coils 1141b, 1143b, and 1145b may be provided on the main substrate 1070, and the main substrate 1070 may be mounted in the housing 1010. Here, although a case in which the main substrate 1070 is entirely integrally provided so that both of the coil for the reflection module 1100 and the coil for the lens module 1200 are mounted is illustrated in FIGS. 2-10, the main substrate 1070 may be divided into two or more separate substrates and provided so that the coil for the reflection module 1100 and the coil for the lens module 1200 may be respectively mounted on separate substrates.

A reinforcement plate (not illustrated) may be mounted on a lower portion of the main substrate 1070 in order to reinforce strength.

In an example, at the time of moving the driving holder 1130 and the driving frame 1120, a closed loop control method of sensing positions of the driving holder 1130 and the driving frame 1120 to provide a feedback may be used.

Therefore, position sensors 1141c and 1143c may be implemented for the closed loop control. The position sensors 1141c and 1143c may be hall sensors, but are not limited thereto.

The position sensors 1141c and 1143c may be disposed at inner sides or outer sides of the coils 1141b and 1143b, respectively, and the position sensors 1141c and 1143c may be mounted on the main substrate 1070 on which the respective coils 1141b and 1143b are mounted.

A gyro sensor (not illustrated) sensing a shake factor such as hand-shake of a user, or the like, may be provided in the main substrate 1070, and a driver integrated circuit (IC) (not illustrated) providing a driving signal to the plurality of coils 1141b, 1143b, and 1145b may be provided.

Figure 11A:
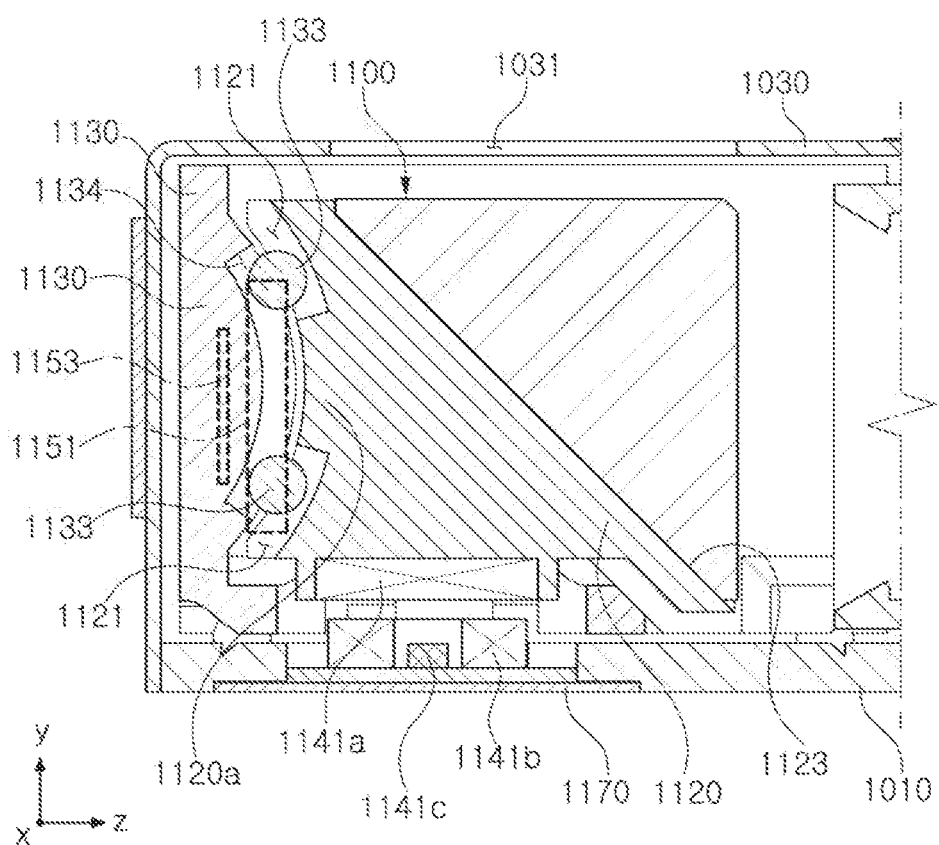
FIGS. 11A through 11C are examples of views schematically illustrating a form in which s driving frame moves in a linear motion or direction (in a rotational motion or direction around an axis parallel to a first axis) in a second axial direction.
Figure 11B:
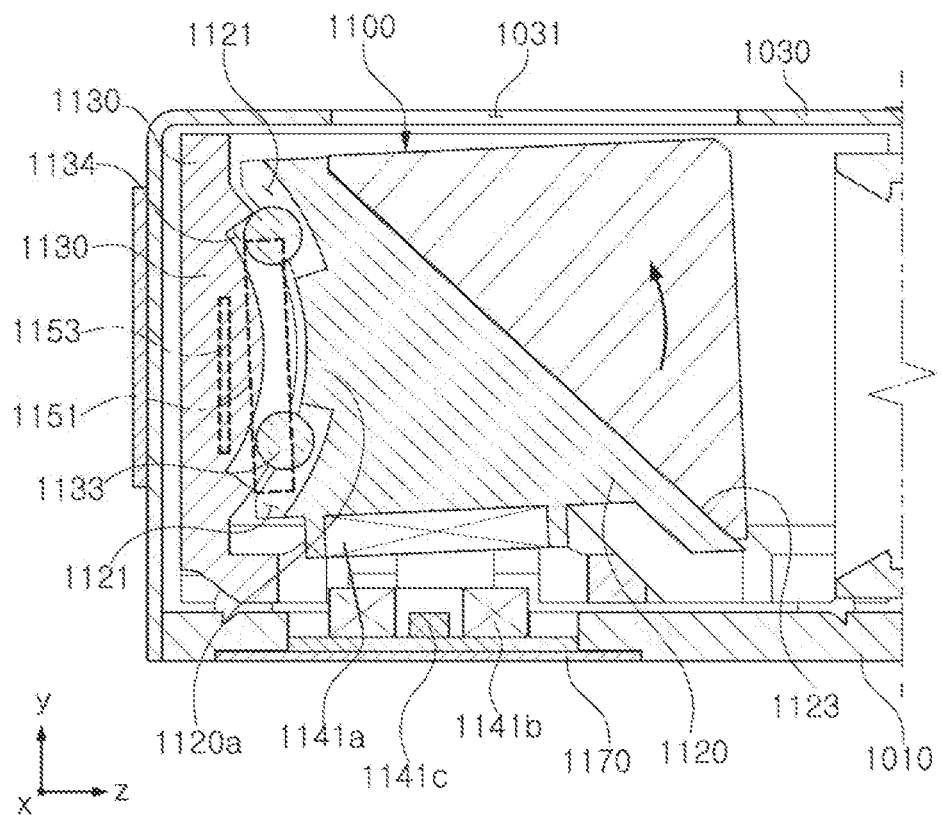
Figure 11C:
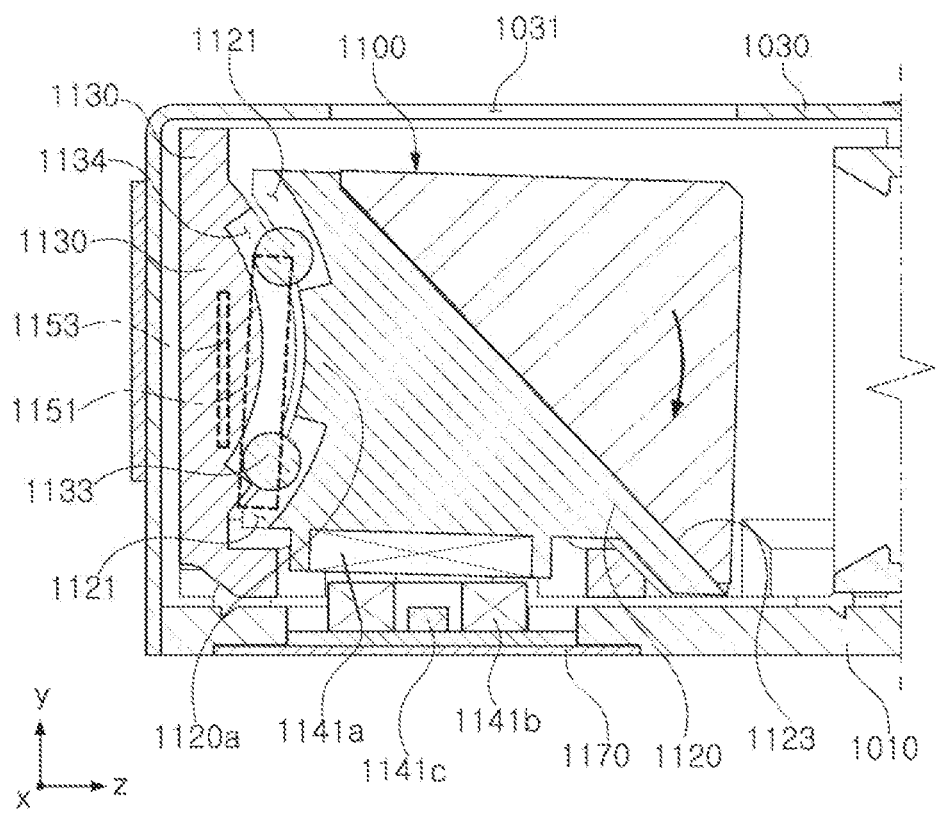

Referring to FIGS. 11A through 11O, when the driving frame 1120 moves in the linear direction along the second axis (the Y-axis) (in the rotational direction around the virtual axis parallel to the first axis (the X-axis)), the driving frame 1120 may move in the linear or rotational direction along the two sets of ball members 1133 provided and arranged along the second axis (the Y-axis).

Figure 12A:
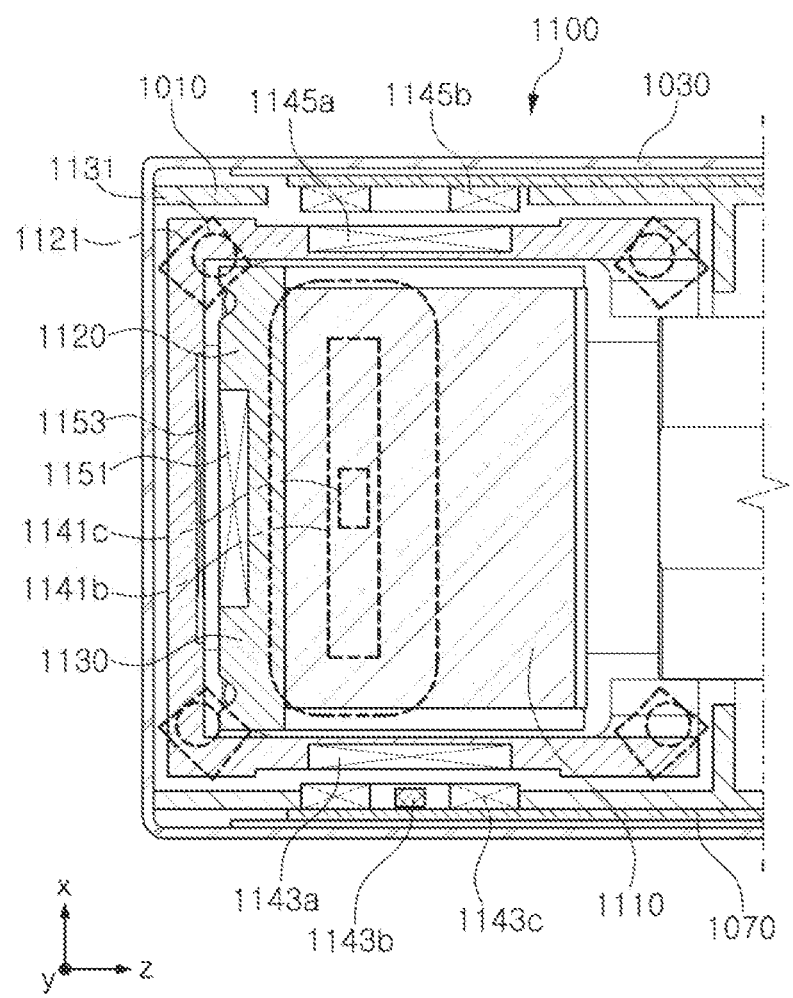
FIGS. 12A through 12C are examples of views schematically illustrating a form in which a driving holder moves in a rotational direction around an axis parallel to the second axis.
Figure 12B:
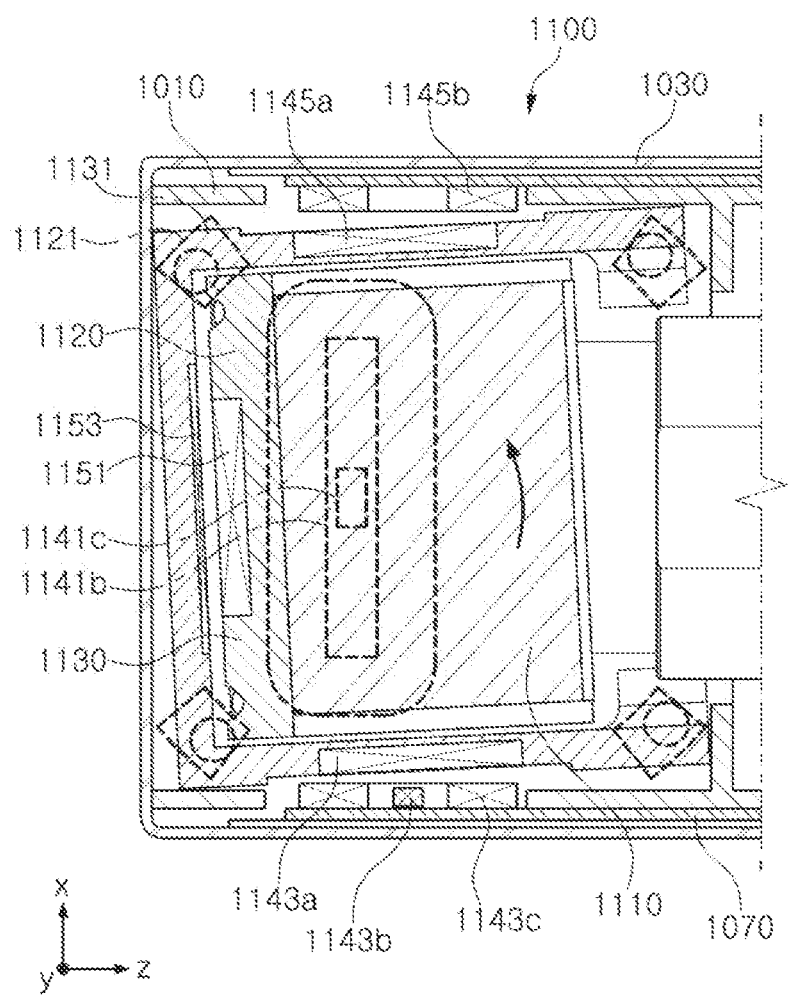
Figure 12C:
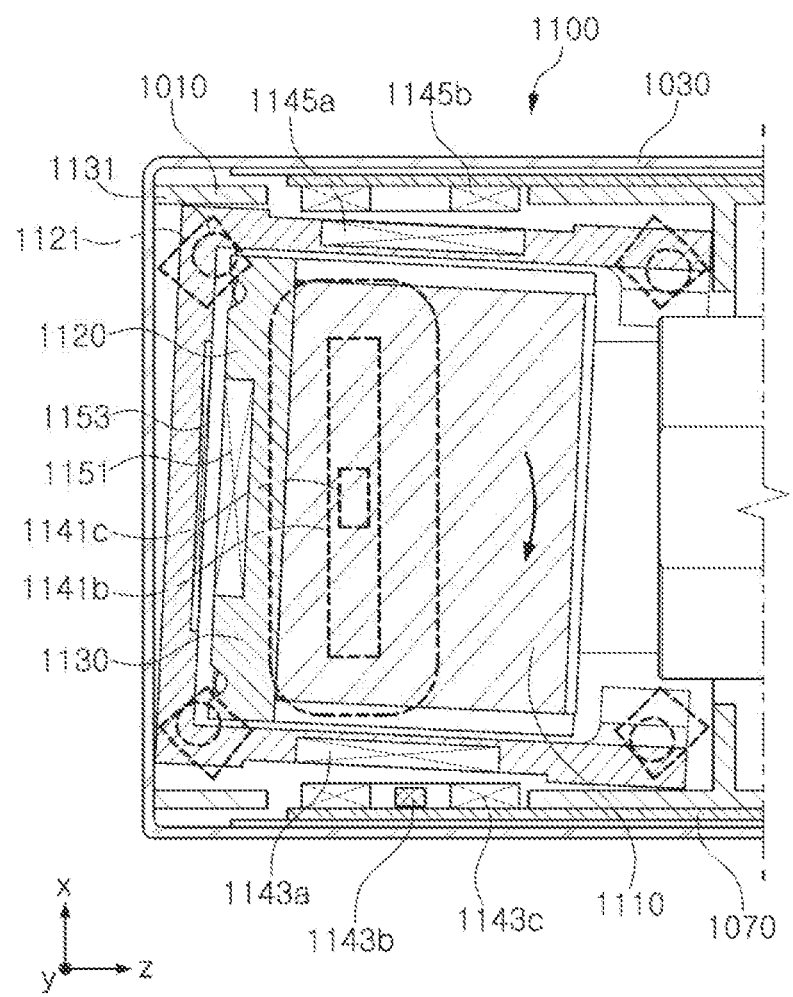

Further, referring to FIGS. 12A through 12C, when the driving holder 1130 moves in the rotational direction around the virtual axis parallel to the second axis (the Y-axis), the driving holder 1130 may rotate along the first ball member 1131 inserted into the first guide groove 1021 provided as the arcs of the circle based on the virtual axis parallel to the second axis (the Y-axis).

As illustrated in FIG. 3A, light of which the path is changed by the reflection module 1100 may be incident on the lens module 1200. Therefore, the optical axis of the plurality of stacked lenses provided in the lens module 1200 may be aligned in the Z-axial direction corresponding to a direction in which the light is projected from the reflection module 1100. Further, the lens module 1200 may include the second driving part 1240 for implementing the AF function, the zoom function, and similar imaging functions. In addition, since the lens module 1200 does not include a separate configuration for optical image stabilization (OIS), the camera module 1200 may therefore have a lower weight than typical camera modules. Accordingly, since in the camera module 1200, the light in the optical path is moved in the optical axial direction in order to implement the AF function and the zoom function, power consumption may be significantly decreased.

The lens module 1200 may include a lens holder 1200 provided in the internal space of the housing 1010 and includes stacked lenses therein, and the second driving part 1240 configured to move the lens holder 1220.

The lens holder 1220 may accommodate the plurality of lenses capturing still or moving images of a subject therein, and the plurality of lenses may be mounted in the lens holder 1220 along the optical axis.

The light of which the movement direction is changed by the reflection module may be refracted while passing through the plurality of lenses. The optical axis (the Z-axis) of the plurality of lenses may be formed to be perpendicular to the thickness (the Y-axis) direction of the lens module 1100.

The lens holder 1220 may be formed to move in the optical axis (Z-axis) direction for autofocusing (AF). As an example, the lens holder 1220 may be formed to be movable in a predetermined direction (including a direction opposite thereto) in which the light of which the movement direction is changed by the reflection module 1100 passes through the plurality of lenses.

The second driving part 1240 may generate a driving force so that the lens holder 1220 may move in the optical axis (Z-axis) direction. That is, the second driving part 1240 may move the lens holder 1220 so as to change a distance between the lens holder 1220 and the reflection module 1100.

As an example, the second driving part 1240 may include the plurality of magnets 1241*a* and 1243*a* and the plurality of coils 1241*b* and 1243*b* disposed to face the plurality of magnets 1241*a* and 1243*a*.

When power is applied to the plurality of coils 1241*b* and 1243*b*, the lens holder 1220 on which the plurality of magnets 1241*a* and 1243*a* are mounted may be moved in the optical axis (Z-axis) direction by electromagnetic interaction between the plurality of magnets 1241*a* and 1243*a* and the plurality of coils 1241*b* and 1243*b*.

The plurality of magnets 1241*a* and 1243*a* may be mounted on the lens holder 1220. As an example, the plurality of magnets 1241*a* and 1243*a* may be mounted on respective side surfaces of the lens holder 1220.

The plurality of coils 1241*b* and 1243*b* may be mounted in the housing 1010. As an example, the main substrate 1070 may be mounted in the housing 1010 in a state in which the plurality of coils 1241*b* and 1243*b* may be mounted on the main substrate 1070. Here, for convenience of explanation, a case in which both of the coil for the reflection module 1100 and the coil for the lens module 1200 are mounted on the main substrate 1070 is illustrated in the accompanying drawings, but the main substrate 1070 is not limited thereto. That is, the main substrate 1070 may be provided in separate substrates on which the coil for the reflection module 1100 and the coil for the lens module 1200 are respectively mounted.

In an example, at the time of moving the lens holder 1220, a closed loop control method of sensing a position of the lens holder 1220 to provide a feedback may be used. Therefore, a position sensor 1243*c* may be implemented for the closed loop control. The position sensor 1243*c* may be a hall sensor, but is not limited thereto.

The position sensor 1243*c* may be disposed at an inner side or outer side of the coil 1243*b*, and may be mounted on the main substrate 1070 on which the coil 1243*b* is mounted.

The lens holder 1220 may be provided in the housing 1010 to be movable in the optical axis (Z-axis) direction. As an example, a plurality of ball members 1250 (FIG. 4) may be disposed between the lens holder 1220 and the housing 1010.

The plurality of ball members 1250 may serve as bearings guiding movement of the lens holder 1220 during an AF process. Further, the plurality of ball members 1250 may also serve to maintain an interval between the lens holder 1220 and the housing 1010.

The plurality of ball members 1250 may move in a rolling motion in the optical axis (the Z-axis) direction when a driving force is generated in the optical axis (the Z-axis) direction. Therefore, the plurality of ball members 1250 may guide movement of the lens holder 1220 in the optical axis (the Z-axis) direction.

A plurality of guide grooves 1221 and 1231 accommodating the plurality of ball members 1250 therein may be formed in at least one of surfaces of the lens holder 1220 and the housing 1010 facing each other.

The plurality of ball members 1250 may be accommodated in the plurality of guide grooves 1221 and 1231 (FIG. 8) to thereby be inserted between the lens holder 1220 and the housing 1010.

The plurality of guide grooves 1221 and 1231 may have a length in the optical axis (the Z-axis) direction.

In an example, movement of the plurality of ball members 1250 in the first axis (the X-axis) direction and the second axis (the Y-axis) direction may be restricted and the plurality of ball members 1250 may move only in the optical axis (the Z-axis) direction in a state in which the plurality of ball members 1250 are accommodated in the plurality of guide grooves 1221 and 1231. As an example, the plurality of ball members 1250 may move in a rolling motion only in the optical axis (the Z-axis) direction.

Accordingly, a plane shape of each of the plurality of guide grooves 1221 and 1231 may be formed in a rectangular manner to be elongated in the optical axis (the Z-axis) direction. Further, cross sections of the plurality of guide grooves 1221 and 1231 may have various shapes such as a rounded shape, a polygonal shape, for example.

The lens holder 1220 may be pressed toward the housing 1010 so that the plurality of ball members maintains a contact state with the lens holder 1220 and the housing 1010.

Accordingly, a yoke 1260 (FIG. 4) may be mounted in the housing 1010 so as to face the plurality of magnets 1241*a* and 1243*a* mounted on the lens holder 1220. The yoke 1260 may be formed of a magnetic material.

An attractive force may act between the yoke 1260 and the plurality of magnets 1241*a* and 1243*a*. Therefore, the lens holder 1220 may be moved in the optical axis (the Z-axis) direction by a driving force of the second driving part 1240 in a state in which the lens holder 1220 comes in contact with the plurality of ball members 1250.

Figure 13:
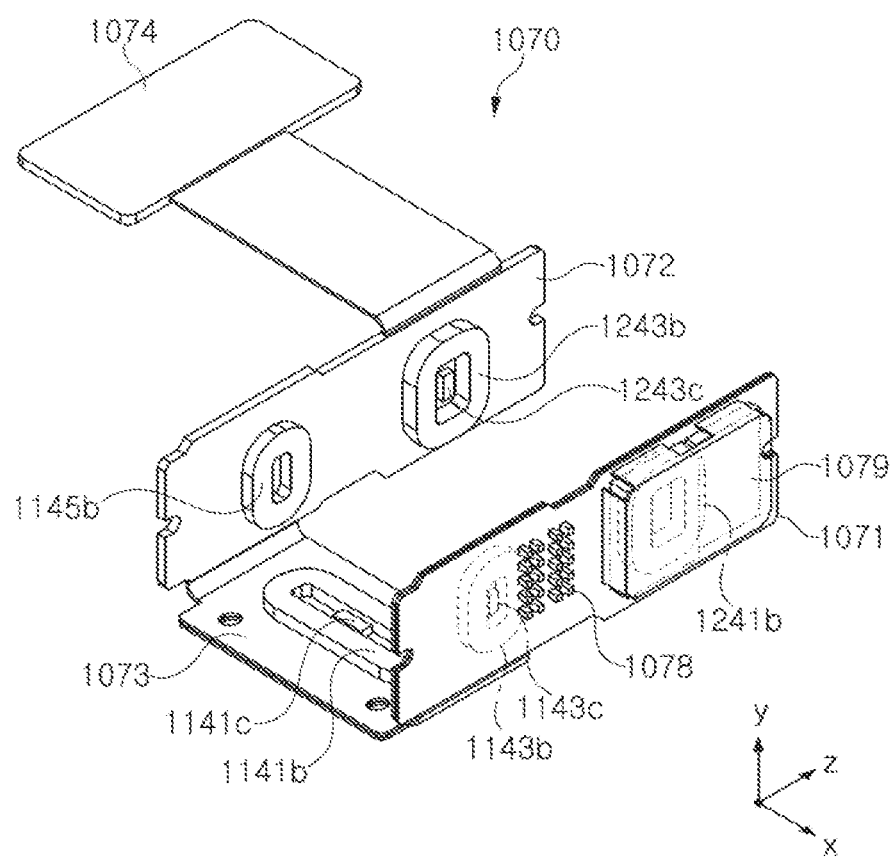
FIG. 13 is an example of a perspective view illustrating a main substrate and coils and components mounted thereon.

FIG. 13 is an example of a perspective view illustrating the main substrate and coils and components mounted thereon.

Referring to FIG. 13, in an example, the plurality of coils 1141*b*, 1143*b*, and 1145*b* of the first driving part 1140 for driving the reflection module 1100 and the plurality of coils 1241b and 1243b of the second driving part 1240 for driving the lens module 1200 may be mounted on an inner surface of the main substrate 1070.

Further, components 1078 such as various elements such as passive elements and active elements, and sensors, such as a gyro sensor 1079, may be mounted on an outer surface of the main substrate 1070. Therefore, the main substrate 1070 may be a double-sided substrate.

More specifically, the main substrate 1070 may include first and second side substrates 1071 and 1072 disposed substantially in parallel to each other and a bottom substrate 1073 connecting the first and second side substrates 1071 and 1072 to each other. A terminal portion 1074, for connecting an external power supply and signal, may be connected to any one of the first and second side substrates 1071 and 1072 and the bottom substrate 1073.

Some of the plurality of coils 1141b, 1143b, and 1145b (for example, coil 1143b) of the first driving part 1140 for driving the reflection module 1110, the sensor 1143c sensing the position of the reflection module 1100, and some of the plurality of coils 1241b and 1243b (for example, coil 1241b) of the second driving part 1240 for driving the lens module 1200 may be mounted on the first side substrate 1071.

Some of the plurality of coils 1141b, 1143b, and 1145b (for example, coil 1145b) of the first driving part 1140 for driving the reflection module 1110, and some of the plurality of coils 1241b and 1243b (for example, coil 1243b) of the second driving part 1240 for driving the lens module 1200 may be mounted on the second side substrate 1072.

Some of the plurality of coils 1141b, 1143b, and 1145b (for example, coil 1141b) of the first driving part 1140 for driving the reflection module 1110 and the sensor 1141c sensing the position of the reflection module 1100 may be mounted on the bottom substrate 1073.

Although a case in which the components 1078 such as various passive elements and active elements, the sensor, such as the gyro sensor 1079, are mounted on the first side substrate 1071 is illustrated in FIG. 13, but the components 1078, the sensor such as the gyro sensor 1079, may also be mounted on the second side substrate 1072 or may be suitably divided and mounted on the first and second side substrates 1071 and 1072.

Figure 14:
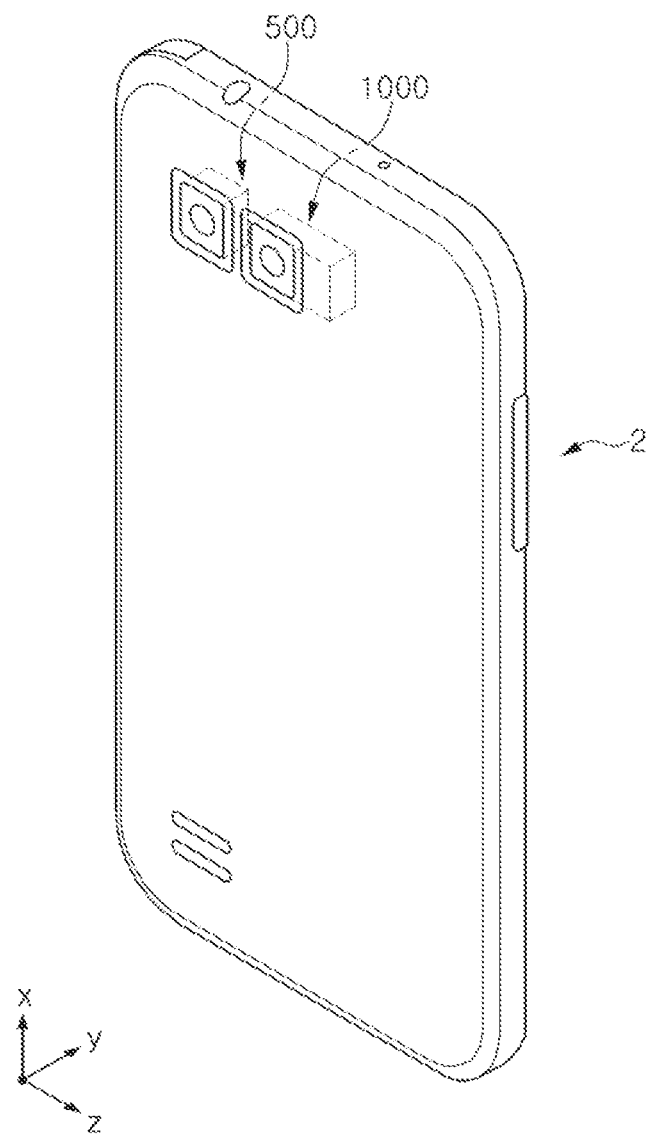
FIG. 14 is an example of a perspective view of a portable electronic device.

FIG. 14 is an example of a perspective view of a portable electronic device.

Referring to FIG. 14, a portable electronic device 2 may be a portable electronic device mounted with a plurality of camera modules 500 and 1000. The portable electronic device may be, for example, a mobile communications terminal, a smart phone, or a tablet PC.

In the example, the plurality of camera modules 500 and 1000 may be mounted in the portable electronic device 2.

At least one of the plurality of camera modules 500 and 1000 may be the camera module 1000 described with reference to FIGS. 2 through 13.

That is, a portable electronic device including a dual camera module, at least one of two camera modules may be provided as the camera module 1000 according to the examples disclosed with respect to FIG. 2-13.

As described above, the camera module and the portable electronic device including the same may have a simple structure and a decreased size while implementing functions such as the AF function, the zoom function, the OIS function, and other similar imaging functions. Further, power consumption may be significantly decreased.

As set forth above, the OIS module and the camera module including the same may have a simple structure and a small size while implementing functions such as the AF function, the zoom function, the OIS function, and the like. Further, power consumption may be significantly decreased.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflection module, comprising:
   a driving holder disposed on a surface of a housing,
   a driving frame comprising a reflection member and supported on a surface of the driving holder in an optical axis direction,
   a driving part configured to provide a driving force to move the driving holder and the driving frame, the driving part comprising a first magnet disposed on the driving holder facing a first coil and a second magnet disposed on the driving frame facing a second coil;
   a pulling magnet disposed on the driving frame; and
   a first pulling yoke disposed on the driving holder,
   wherein the driving holder is configured to rotate about a second axial direction substantially perpendicular to the optical axis direction relative to the housing to move the reflection member about the second axial direction, and
   wherein the driving frame is configured to rotate about a first axial direction substantially perpendicular to the optical axis direction and the second axial direction relative to the housing to move the reflection member about the first axial direction.

2. The reflection module of claim 1, wherein the driving frame is supported on an inner surface of the driving holder by a magnetic attractive force between the pulling magnet and the first pulling yoke.

3. The reflection module of claim 2, wherein the driving frame is pulled to the inner surface of the driving holder by the magnetic attractive force in the optical axis direction.

4. The reflection module of claim 1, wherein the driving holder is pulled to the housing by a magnetic attractive force between the second magnet and a second pulling yoke.

5. The reflection module of claim 4, wherein the driving holder is pulled to the housing by the magnetic attractive force in the first axial direction.

6. The reflection module of claim 1, wherein the driving frame moves in a rotational direction around the first axial direction that is perpendicular to the optical axis when the driving frame is supported on an inner surface of the driving holder.

7. The reflection module of claim 1, wherein a plurality of ball members are disposed between the driving holder and the surface of the housing.

8. The reflection module of claim 7, wherein a plurality of guide grooves in which the plurality of ball members are accommodated are formed in a surface of the driving holder facing the housing.

9. The reflection module of claim 8, wherein the plurality of guide grooves comprise a rounded shape.

10. The reflection module of claim 7, wherein a plurality of guide grooves in which the plurality of ball members are accommodated are formed in the surface of the housing facing the driving holder.

11. The reflection module of claim 10, wherein the plurality of guide grooves comprise a rounded shape.

12. The reflection module of claim 7, wherein a plurality of guide grooves in which the plurality of ball members are accommodated are formed in one of the surface of the housing and the surface of the driving holder facing the housing,
the surface of the driving holder facing the housing has a tetragonal shape, and
the plurality of guide grooves are formed in one or more of four corner portions of the surface of the driving holder facing the housing and a portion of the housing that faces the corner portions of the driving holder.

13. The reflection module of claim 12, wherein the plurality of guide grooves are formed in an arc shape based on an axis that is parallel to the second axial direction.

14. The reflection module of claim 7, wherein the plurality of ball members disposed between the driving holder and the surface of the housing comprise one or more of fixed to the driving holder, fixed to the housing, and freely rotatable.

15. The reflection module of claim 1, wherein a plurality of ball members are disposed between the driving frame and the surface of the driving holder.

16. The reflection module of claim 15, wherein a guide rail, protruding toward the driving frame in a rounded shape, is formed in the surface of the driving holder facing the driving frame, and
a plurality of guide grooves, in which the plurality of ball members are accommodated, is formed in the guide rail.

17. The reflection module of claim 16, wherein a guide rail accommodation portion recessed in a rounded shape is formed in the driving frame facing the surface of the driving holder, and
a plurality of guide grooves, in which the plurality of ball members are accommodated, are formed in the guide rail accommodation portion.

18. The reflection module of claim 15, wherein a plurality of guide grooves, in which the plurality of ball members are accommodated, are formed in the driving frame or the inner surface of the driving holder, and
the plurality of guide grooves are extended in a second axial direction and are formed as two guide grooves spaced apart from each other in the first axial direction in the driving frame or the driving holder.

19. The reflection module of claim 18, wherein the plurality of guide grooves are formed in an arc shape based on an axis that is parallel to the first axial direction.

20. The reflection module of claim 15, wherein the plurality of ball members disposed between the driving frame and the inner surface of the driving holder comprise one or more of fixed to the driving frame, fixed to the driving holder, and freely rotatable.

21. The reflection module of claim 1, wherein the driving holder is configured to rotate about the second axial direction in response to a magnetic driving force between the second magnet and the second coil.

22. The reflection module of claim 21, wherein the second magnet comprises a first-second magnet and a second-second magnet spaced apart from the first-second magnet in the first axis direction, and
wherein the second coil comprises a first-second coil facing the first-second magnet and a second-second coil facing the second-second magnet.

23. The reflection module of claim 1, wherein the driving holder is configured to rotate about the first axial direction in response to a magnetic driving force between the first magnet and the first coil.

24. A camera module comprising:
a lens module comprising a plurality of lenses; and
the reflection module of claim 1, disposed in front of the lens module and configured to change a path of light incident in the camera module toward the lens module.

25. A reflection module, comprising:
a housing;
a driving holder;
a driving frame coupled to the driving holder and comprising a reflection member;
a driving part configured to provide a driving force to move the driving holder and the driving frame, the driving part comprising a first magnet disposed on the driving holder facing a first coil disposed on the housing and a second magnet disposed on the driving frame facing a second coil disposed on the housing;
a pulling magnet disposed on the driving frame; and
a first pulling yoke disposed on the driving holder,
wherein the driving holder is configured to move in one or more of a first axis direction and a rotational direction around a virtual axis parallel to a second axis direction to move the reflection member in the first axis direction, and
the driving frame is configured to move in one or more of the second axis direction and a rotational direction around a virtual axis parallel to the first axis direction to move the reflection member in the second axis direction,
wherein the driving holder is supported on a surface of the housing by a magnetic pulling force between the second magnet and a second pulling yoke, and the driving frame is supported on a surface of the driving holder by a magnetic pulling force between the pulling magnet and the first pulling yoke in a direction perpendicular to the first axis direction and the second axis direction, and
wherein the surface of the housing and the surface of the driving holder overlap each other.

26. The reflection module of claim of claim 25, wherein the movement of the driving frame and the movement of the driving holder changes a movement direction of light incident on the reflection member.

27. The reflection module of claim 25, wherein the driving frame simultaneously moves in a rotational direction while moving in a linear direction in the driving holder.

28. The reflection module of claim of claim 25, wherein a plurality of ball members are disposed between the driving frame and an inner surface of the driving holder.

29. The reflection module of claim of claim 25, further comprising:
a plurality of ball members disposed between the driving frame and the surface of the driving holder;
a guide rail, protruding toward the driving frame in a rounded shape, formed in the surface of the driving holder facing the driving frame;

a plurality of guide grooves, in which the plurality of ball members are accommodated, formed in the guide rail;

a guide rail accommodation portion recessed in a rounded shape formed in the driving frame facing the surface of the driving holder; and a plurality of guide grooves, in which the plurality of ball members are accommodated, formed in the guide rail accommodation portion.

* * * * *